United States Patent
Zacharias et al.

(10) Patent No.: US 10,058,022 B2
(45) Date of Patent: *Aug. 28, 2018

(54) FLOW CONTROL ASSEMBLY FOR AN AGRICULTURAL METERING SYSTEM

(71) Applicant: CNH Industrial Canada, Ltd., Saskatoon (CA)

(72) Inventors: Darwin Lloyd Zacharias, Saskatoon (CA); Graham Douglas Stuart, Warman (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/709,959

(22) Filed: Sep. 20, 2017

(65) Prior Publication Data

US 2018/0020609 A1    Jan. 25, 2018

Related U.S. Application Data

(63) Continuation of application No. 14/931,935, filed on Nov. 4, 2015, now Pat. No. 9,769,976.

(60) Provisional application No. 62/074,880, filed on Nov. 4, 2014.

(51) Int. Cl.
  *B65G 53/46* (2006.01)
  *A01C 7/10* (2006.01)
  *A01C 7/08* (2006.01)

(52) U.S. Cl.
  CPC .............. *A01C 7/102* (2013.01); *A01C 7/081* (2013.01)

(58) Field of Classification Search
  CPC ......... A01C 7/084; B65G 53/46; B65G 53/16
  USPC ........ 406/2, 181, 183, 131; 74/25; 111/174, 111/175
  See application file for complete search history.

(56) References Cited

U.S. PATENT DOCUMENTS

| | | |
|---|---|---|
| 2,693,816 A | 11/1954 | Hoelzer |
| 2,940,322 A | 6/1960 | Uhing |
| 3,768,775 A | 10/1973 | Archer |
| 3,983,758 A | 10/1976 | Hovekamp |
| 4,231,389 A | 11/1980 | Still et al. |
| 4,236,415 A | 12/1980 | Musial |
| 4,246,115 A | 1/1981 | Swank |
| 4,770,388 A | 9/1988 | Carman |
| 4,909,275 A | 3/1990 | Massey et al. |
| 5,108,038 A | 4/1992 | Palladino et al. |
| 5,243,767 A | 9/1993 | Stein |
| 5,622,201 A | 4/1997 | Chang |

(Continued)

*Primary Examiner* — Joseph Dillon, Jr.
(74) *Attorney, Agent, or Firm* — Rebecca L. Henkel; Rickard K. DeMille

(57) ABSTRACT

A flow control assembly for an agricultural metering system includes a first gate control shaft configured to drive a first gate of a seed meter to transition between an open position and a closed position. The flow control assembly also includes a handle configured to drive the first gate control shaft to rotate via rotation of the handle between a first position that corresponds to the open position of the first gate and a second position that corresponds to the closed position of the first gate. In addition, the flow control assembly includes a locking assembly configured to secure the handle to the first gate control shaft at least while the handle is in the first position, and to enable the handle to be released from the first gate control shaft at least while the handle is in the second position.

20 Claims, 9 Drawing Sheets

(56) References Cited

U.S. PATENT DOCUMENTS

| | | |
|---|---|---|
| 6,298,797 B1 | 10/2001 | Mayerle et al. |
| 6,715,483 B2 | 4/2004 | Erdmann et al. |
| 6,834,599 B1 | 12/2004 | Fuessel et al. |
| 8,371,238 B2 | 2/2013 | Dean et al. |
| 8,601,892 B2 | 12/2013 | Pritchard et al. |
| 8,807,520 B2 | 8/2014 | Bunod et al. |
| 8,821,078 B2 | 9/2014 | Hockett et al. |
| 2005/0076728 A1 | 4/2005 | Rastegar et al. |
| 2006/0102450 A1* | 5/2006 | Posner .................... B07B 4/08 198/752.1 |
| 2009/0149124 A1* | 6/2009 | Stevenson .......... B60H 1/00671 454/358 |
| 2011/0120241 A1 | 5/2011 | Caliari |
| 2012/0103238 A1 | 5/2012 | Beaujot et al. |
| 2012/0211508 A1 | 8/2012 | Barsi et al. |
| 2014/0190584 A1 | 7/2014 | Johnson et al. |

* cited by examiner

FLOW CONTROL ASSEMBLY FOR AN AGRICULTURAL METERING SYSTEM

CROSS-REFERENCE TO RELATED APPLICATIONS

The present application is a continuation of U.S. application Ser. No. 14/931,935, entitled "FLOW CONTROL ASSEMBLY FOR AN AGRICULTURAL METERING SYSTEM", filed Nov. 4, 2015, now U.S. Pat. No. 9,769,976 issued on Sep. 26, 2017, which claims priority from and the benefit of U.S. Provisional Application Ser. No. 62/074,880, entitled "FLOW CONTROL ASSEMBLY FOR AN AGRICULTURAL METERING SYSTEM," filed Nov. 4, 2014. Each of the forgoing applications is hereby incorporated by reference in its entirety.

BACKGROUND

The invention relates generally to a flow control assembly for an agricultural metering system.

Generally, seeding implements (e.g., seeders) are towed behind a tractor or other work vehicle via a mounting bracket secured to a rigid frame of the implement. Seeding implements typically include multiple row units distributed across a width of the implement. Each row unit is configured to deposit seeds at a desired depth beneath the soil surface of a field, thereby establishing rows of planted seeds. For example, each row unit typically includes a ground engaging tool or opener that forms a seeding path (e.g., trench) for seed deposition into the soil. A seed tube (e.g., coupled to the opener) is configured to deposit seeds and/or other agricultural products (e.g., fertilizer) into the trench. The opener/seed tube is followed by closing discs that move displaced soil back into the trench and/or a packer wheel that packs the soil on top of the deposited seeds.

In certain configurations, an air cart is used to meter and deliver agricultural product (e.g., seeds, fertilizer, etc.) to the row units of the seeding implement. The air cart generally includes a storage tank (e.g., a pressurized tank), an air source (e.g., a blower), and a metering system. The product is typically gravity fed from the storage tank to the metering system which distributes a desired volume of product into an air flow generated by the air source. The air flow carries the product to the row units via conduits extending between the air cart and the seeding implement. The metering system typically includes meter rollers that regulate the flow of product based on meter roller geometry and rotation rate.

Certain metering systems include gates configured to direct the product from each meter roller to a desired conduit and/or to direct the product to bypass the meter roller, e.g., to facilitate a clean-out process. However, it may be undesirable to open more than one gate concurrently. For example, the clean-out process may include blocking product flow to the metering system, opening the meter roller bypass gate, and draining the remaining product from the metering system. However, if a gate to one of the conduits is open during the clean-out process, the material may drain into the respective conduit, which may at least partially block flow through the conduit during subsequent seeding operations.

BRIEF DESCRIPTION

In one embodiment, a flow control assembly for an agricultural metering system includes a first gate control link configured to couple to a first gate of a seed meter. The first gate control link is configured to move the first gate between an open position and a closed position. The flow control assembly also includes a first gate control shaft coupled to the first gate control link. The first gate control shaft is configured to drive the first gate control link to move the first gate via rotation of the first gate control shaft. In addition, the flow control assembly includes a second gate control link configured to couple to a second gate of the seed meter. The second gate control link is configured to move the second gate between an open position and a closed position. The flow control assembly further includes a second gate control shaft coupled to the second gate control link. The second gate control shaft is configured to drive the second gate control link to move the second gate via rotation of the second gate control shaft. The flow control assembly also includes a handle configured to selectively engage each of a first engagement portion of the first gate control shaft and a second engagement portion of the second gate control shaft. The handle is configured to drive the first gate control shaft to rotate via rotation of the handle between a first position that corresponds to the open position of the first gate and a second position that corresponds to the closed position of the first gate while the handle is engaged with the first engagement portion, and the handle is configured to drive the second gate control shaft to rotate via rotation of the handle between a third position that corresponds to the open position of the second gate and a fourth position that corresponds to the closed position of the second gate while the handle is engaged with the second engagement portion. In addition, the flow control assembly includes a locking assembly configured to secure the handle to the first engagement portion at least while the handle is in the first position, to enable the handle to be released from the first engagement portion at least while the handle is in the second position, to secure the handle to the second engagement portion at least while the handle is in the third position, and to enable the handle to be released from the second engagement portion at least while the handle is in the fourth position.

In another embodiment, a flow control assembly for an agricultural metering system includes a first gate control shaft configured to drive a first gate of a seed meter to transition between an open position and a closed position via rotation of the first gate control shaft. The flow control assembly also includes a second gate control shaft configured to drive a second gate of the seed meter to transition between an open position and a closed position via rotation of the second gate control shaft. In addition, the flow control assembly includes a handle configured to selectively engage each of a first engagement portion of the first gate control shaft and a second engagement portion of the second gate control shaft. The handle is configured to drive the first gate control shaft to rotate via rotation of the handle between a first position that corresponds to the open position of the first gate and a second position that corresponds to the closed position of the first gate while the handle is engaged with the first engagement portion, and the handle is configured to drive the second gate control shaft to rotate via rotation of the handle between a third position that corresponds to the open position of the second gate and a fourth position that corresponds to the closed position of the second gate while the handle is engaged with the second engagement portion. The flow control assembly further includes a locking bar coupled to a frame of the agricultural metering system. The locking bar includes at least one recess configured to selectively receive a locking plate of the handle at least while the handle is in the first position and the third position to secure the handle to a respective engagement portion.

In a further embodiment, a flow control assembly for an agricultural metering system includes a first gate control shaft configured to drive a first gate of a seed meter to transition between an open position and a closed position via rotation of the first gate control shaft. The flow control assembly includes a first engagement feature non-rotatably coupled to the first gate control shaft and movable along the first gate control shaft. The first engagement feature is configured to block rotation of the first gate control shaft while the first engagement feature is engaged and to facilitate rotation of the first gate control shaft while the first engagement feature is disengaged, and the first engagement feature is configured to disengage via translation in a longitudinal direction relative to the first gate control shaft. The flow control assembly also includes a second gate control shaft configured to drive a second gate of the seed meter to transition between an open position and a closed position via rotation of the second gate control shaft. The flow control assembly includes a second engagement feature non-rotatably coupled to the second gate control shaft and movable along the second gate control shaft. The second engagement feature is configured to block rotation of the second gate control shaft while the second engagement feature is engaged and to facilitate rotation of the second gate control shaft while the second engagement feature is disengaged, and the second engagement feature is configured to disengage via translation in a longitudinal direction relative to the second gate control shaft. In addition, the flow control assembly includes a handle configured to selectively engage each of a first engagement portion of the first gate control shaft and a second engagement portion of the second gate control shaft. The handle is configured to drive the first gate control shaft to rotate via rotation of the handle between a first position that corresponds to the open position of the first gate and a second position that corresponds to the closed position of the first gate while the handle is engaged with the first engagement portion, and the handle is configured to drive the second gate control shaft to rotate via rotation of the handle between a third position that corresponds to the open position of the second gate and a fourth position that corresponds to the closed position of the second gate while the handle is engaged with the second engagement portion. The flow control assembly further includes a locking assembly configured to secure the handle to the first engagement portion at least while the handle is in the first position, to enable the handle to be released from the first engagement portion at least while the handle is in the second position, to secure the handle to the second engagement portion at least while the handle is in the third position, and to enable the handle to be released from the second engagement portion at least while the handle is in the fourth position.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
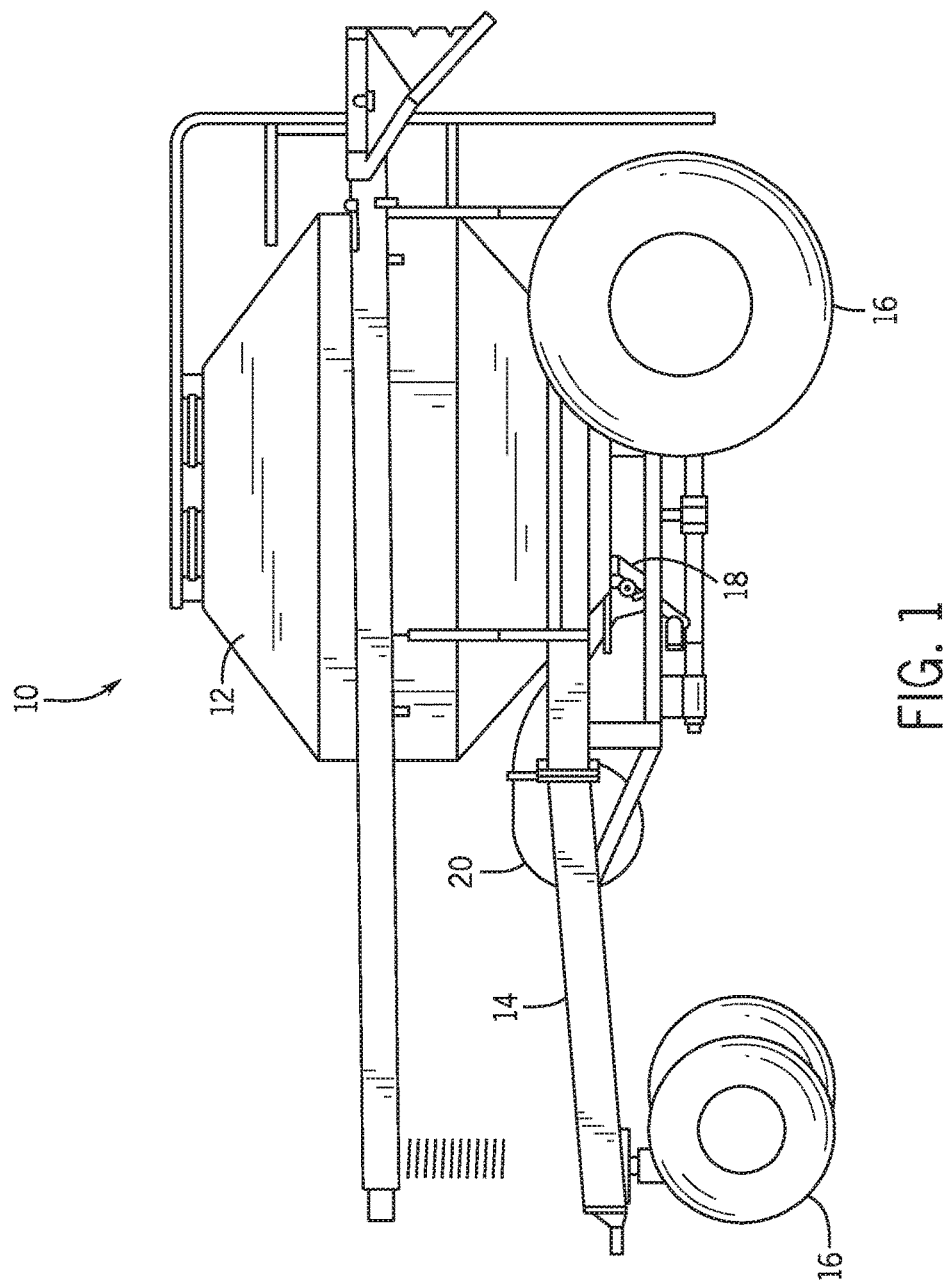
FIG. 1 is a side view of an embodiment of an air cart, including a metering system configured to regulate a flow of particulate material.

Turning now to the drawings, FIG. 1 is a side view of an air cart 10 that may be used in conjunction with a towable agricultural implement to deposit seeds into the soil. For example, certain agricultural implements include row units configured to open the soil, dispense seeds into the soil opening, and re-close the soil. Such implements are generally coupled to a tow vehicle, such as a tractor, and pulled through a field. In certain configurations, seeds are conveyed to the row units by the illustrated air cart 10, which is generally towed in sequence with the implement. In certain configurations, the air cart 10 may be configured to provide fertilizer to the row units, or a combination of seeds and fertilizer.

In the illustrated embodiment, the air cart 10 includes a storage tank 12, a frame 14, wheels 16, a metering system 18, and an air source 20. In certain configurations, the storage tank 12 includes multiple compartments for storing various flowable particulate materials. For example, one compartment may include seeds, such as canola or mustard, and another compartment may include a dry fertilizer. In such configurations, the air cart 10 is configured to delivery both the seeds and fertilizer to the implement. The frame 14 includes a towing hitch configured to couple to the implement or tow vehicle. As discussed in detail below, seeds and/or fertilizer within the storage tank 12 are gravity fed into the metering system 18. The metering system 18 includes one or more meter rollers that regulate the flow of material from the storage tank 12 into an air flow provided by the air source 20. The air flow then carries the material to the implement by pneumatic conduits. In this manner, the row units receive a supply of seeds and/or fertilizer for deposition within the soil.

Figure 2:
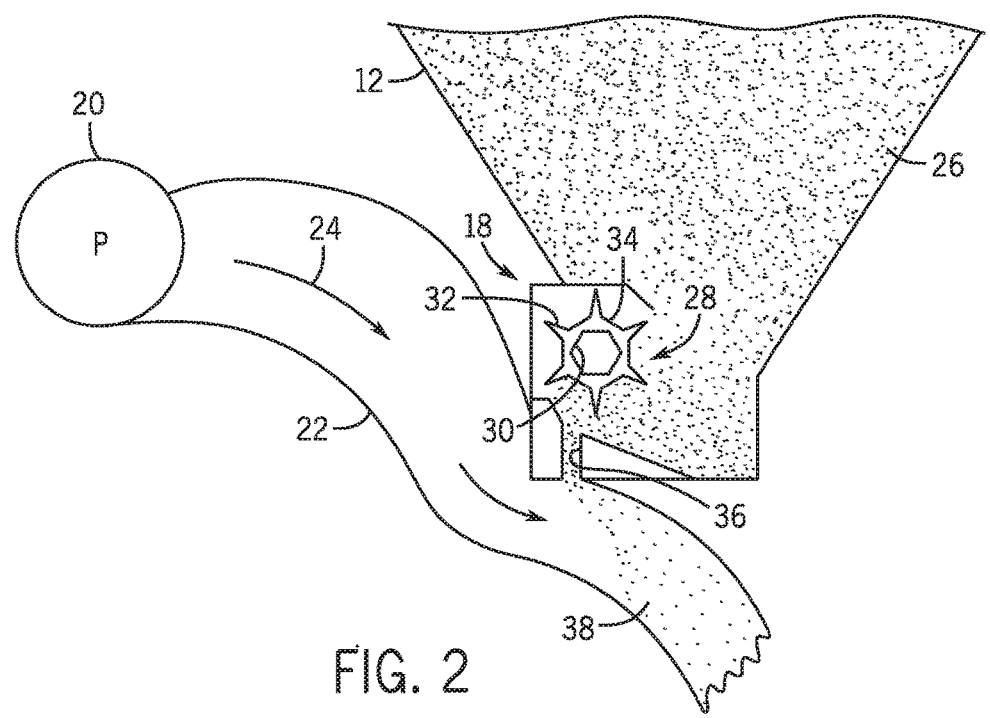
FIG. 2 is a schematic view of an embodiment of a metering system that may be employed within the air cart of FIG. 1.

FIG. 2 is a schematic view of the metering system 18, as shown in FIG. 1. As illustrated, the air source 20 is coupled to a conduit 22 configured to flow air 24 past the metering system 18. The air source 20 may be a pump or blower powered by an electric or hydraulic motor, for example. Flowable particulate material 26 (e.g., seeds, fertilizer, etc.) within the storage tank 12 flows by gravity into the metering system 18. In certain embodiments, the storage tank 12 is pressurized such that a static pressure in the tank 12 is greater than a static pressure in the conduit 22, thereby facilitating an even flow of material through the metering system 18. The metering system 18 includes one or more meter rollers 28 configured to regulate the flow of material 26 into the air flow 24. For example, certain metering systems 18 may include ten meter rollers 28, each disposed within an independent seed meter and each configured to flow particulate material into a respective conduit 22 for distribution to one or more respective row units of the agricultural implement. Such metering systems are known as "10-run" metering system. However, in alternative embodiments, the metering system 18 may include more or fewer meter rollers, e.g., 5, 6, 7, 8, 9, 11, or more.

As illustrated, the meter roller 28 includes an interior cavity 30 configured to receive a shaft that drives the meter roller 28 to rotate. In the present embodiment, the cavity 30 has a hexagonal cross section. However, alternative embodiments may include various other cavity configurations (e.g., triangular, square, keyed, splined, etc.). The shaft is coupled to a drive unit, such as an electric or hydraulic motor, configured to rotate the meter roller 28. Alternatively, the meter roller 28 may be coupled to a wheel 16 by a gear assembly such that rotation of the wheel 16 drives the meter roller 28 to rotate. Such a configuration automatically varies the rotation rate of the meter roller 28 based on the speed of the air cart 10.

The meter roller 28 also includes multiple flutes 32 and recesses 34. The number and geometry of the flutes 32 are particularly configured to accommodate the material 26 being distributed. The illustrated meter roller 28 includes six flutes 32 and a corresponding number of recesses 34. Alternative embodiments may include more or fewer flutes 32 and/or recesses 34. For example, the meter roller 28 may include 2, 4, 6, 8, 10, 12, 14, 16, 18, 20, or more flutes 32 and/or recesses 34. In addition, the depth of the recesses 34 and/or the height of the flutes 32 are configured to accommodate the material 26 within the storage tank 12. For example, a meter roller having deeper recesses 34 and fewer flutes 32 may be employed for larger seeds, while a meter roller having shallower recesses 34 and more flutes 32 may be employed for smaller seeds. Other parameters such as flute pitch (i.e., angle of the flute relative to a longitudinal/rotational axis) and flute angle (i.e., angle of the flute relative to a radial axis) may also be particularly selected to accommodate the material 26.

For a particular meter roller configuration, the rotation rate of the meter roller 28 controls the flow of material 26 from the meter roller into the air stream 24. For example, as the meter roller 28 rotates, the meter roller transfers material through an opening 36 in the metering system 18 into a respective conduit 22 (e.g., into a conduit associated with a respective row unit or group of row units). The material then mixes with air from the air source 20, thereby forming an air/material mixture 38. The mixture then flows to the respective row unit(s) of the implement via pneumatic conduits, where the seeds and/or fertilizer are deposited within the soil.

Figure 3:
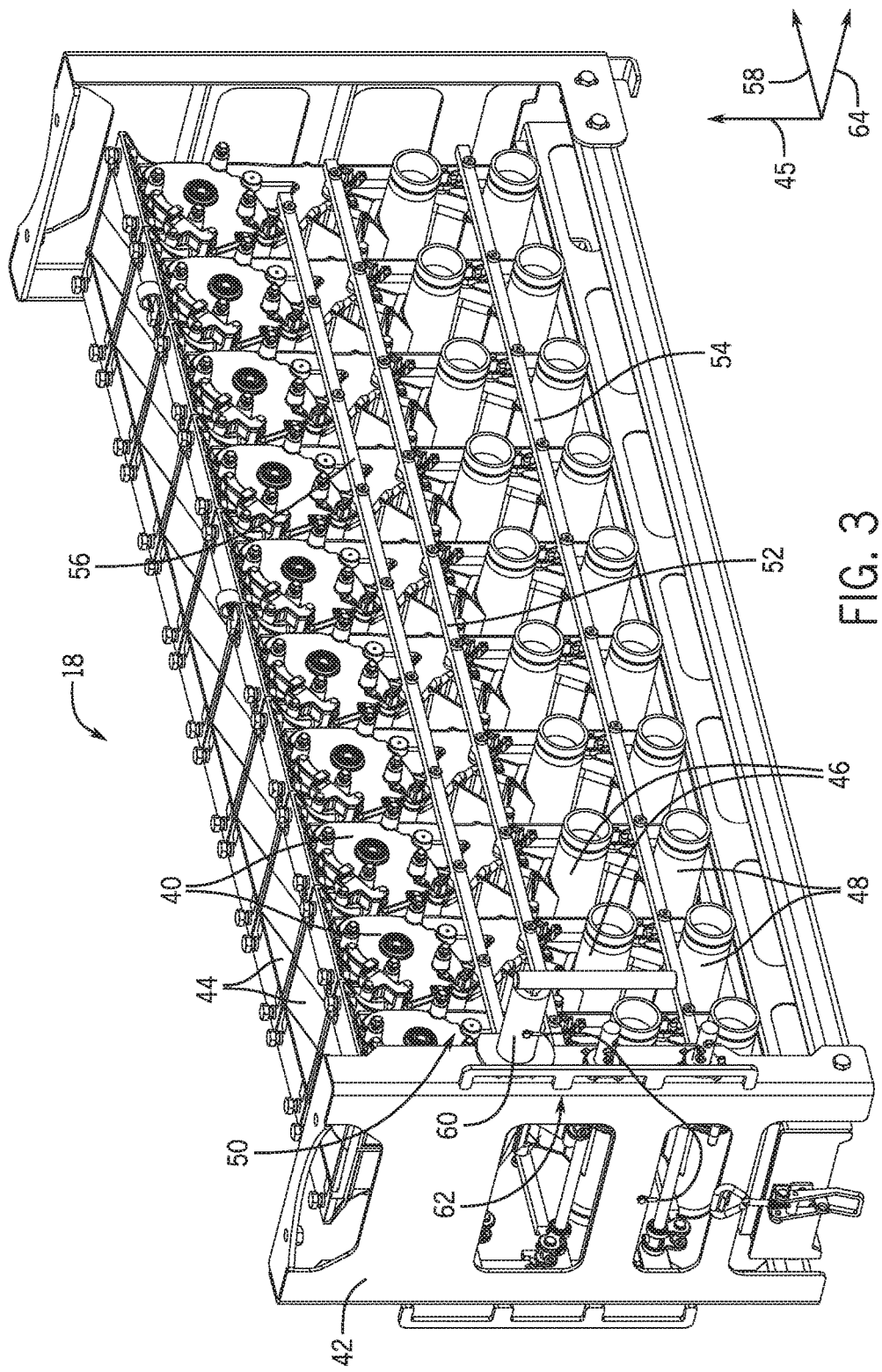
FIG. 3 is a perspective view of an embodiment of a metering system that may be employed within the air cart of FIG. 1, including multiple seed meters.

FIG. 3 is a perspective view of an embodiment of a metering system 18 that may be employed within the air cart of FIG. 1. As illustrated, the metering system 18 includes ten seed meters 40 supported by a frame 42. While the illustrated embodiment includes ten seed meters 40, it should be appreciated that more or fewer seed meters may be employed in alternative embodiments. For example, certain metering systems may include 1, 2, 4, 6, 8, 10, 12, 14, or more seed meters 40. Each seed meter 40 includes at least one respective meter roller to control flow of particulate material to a respective conduit. Each seed meter 40 also includes an inlet 44 configured to receive the particulate material from a storage tank (e.g., along a vertical axis 45). Furthermore, each seed meter 40 includes a first conduit connector 46 and a second conduit connector 48. Each conduit connector is configured to receive the air flow from the air source and the particulate material flow from the meter roller, thereby producing the air/material mixture. First conduits may be coupled to the first conduit connectors 46 and second conduits may be coupled to the second conduit connectors 48. The conduits may be coupled to respective row units and/or distribution headers that provide particular material to multiple row units.

As discussed in detail below, each seed meter 40 includes gates configured to direct the particulate material to the first conduit connector 46 or to the second conduit connect 48. For example, a first gate may control flow to the first conduit connector 46 and a second gate may control flow to the second conduit connector 48. Accordingly, the seed meter includes a flow control assembly 50 configured to adjust the position of each gate. As illustrated, the flow control assembly 50 includes a first gate control link, such as the illustrated first gate control rod 52, a second gate control link, such as the illustrated second gate control rod 54, and a third gate control link, such as the illustrated third gate control rod 56. The first gate control rod 52 is coupled to a respective first gate of each seed meter 40. Movement of the first gate control rod 52 along a lateral axis 58 drives each first gate to transition (e.g., move) between an open position that facilitates material flow to the first conduit connector 46 and a closed position that blocks material flow to the first conduit connector 46. Similarly, the second gate control rod 54 is coupled to a respective second gate of each seed meter 40. Movement of the second gate control rod 54 along the lateral axis 58 drives each second gate to transition (e.g., move) between an open position that facilitates material flow to the second conduit connector 48 and a closed position that blocks material flow to the second conduit connector 48. Moreover, the third gate control rod 56 is coupled to a respective third gate of each seed meter 40, which is configured to control calibration and clean-out operations. Movement of the third gate control rod 56 along the lateral axis 58 drives each third gate to transition (e.g., move) between an open position and a closed position.

In the illustrated embodiment, the flow control assembly 50 includes a handle 60 configured to actuate the gate control rods 52, 54, and 56. As discussed in detail below, the handle is configured to engage an engagement portion of a respective gate control shaft associated with each gate control rod. Rotation of the handle drives the gate control shaft to rotate, thereby driving the associated gate control rod to translate along the lateral axis 58. For example, the first gates may be opened or closed by coupling the handle 60 to the engagement portion of the gate control shaft associated with the first gate control rod 52 and rotating the handle to an orientation corresponding to an open gate position or an orientation corresponding to a closed gate position. Similarly, the second gates may be opened or closed by coupling the handle 60 to the engagement portion of the gate control shaft associated with the second gate control rod 54 and rotating the handle to an orientation corresponding to an open gate position or an orientation corresponding to a closed gate position.

However, it may be undesirable to open more than one set of gates concurrently. For example, during a clean-out procedure, the third gates are opened to bypass the seed meter, thereby enabling the material remaining in each seed meter to flow through an opening at the bottom of the seed meter. However, if the first or second gates are open during the clean-out procedure, the material may drain into the respective conduits, which may at least partially block flow through the conduits during subsequent seeding operations. Accordingly, in the illustrated embodiment, the flow control assembly 50 includes a locking assembly 62 configured to secure the handle to an engagement portion of a gate control shaft at least while the handle is in an orientation that corresponds to an open position of gates associated with the gate control shaft. For example, while the third gates are in the open position, the locking assembly 62 secures the handle 60 to the engagement portion of the gate control shaft associated with the third gates. Accordingly, the handle may not be removed from the engagement portion and used to open another set of gates. However, when the third gates are closed (e.g., via rotation of the handle to an orientation that corresponds to closed gates), the locking assembly 62 enables the handle to be removed from the engagement portion of the gate control shaft associated with the third gates (e.g., via movement of the handle along a longitudinal axis 64). The handle may then engage another engagement portion to facilitate opening a corresponding set of gates.

In certain embodiments, the air cart may include a second metering system positioned downstream from the first metering system along the longitudinal axis 64 and aligned with the first metering system along the lateral axis 58. First conduits may extend from the first conduit connectors 46 to corresponding first conduit connectors of the second metering system. Similarly, second conduits may extend from the second conduit connectors 48 to corresponding second conduit connectors of the second metering system. The two metering systems may be configured to separately provide two different products to each row unit (e.g., a double-shoot row unit). For example, the first gates of the first metering system may be transitioned to the open position (e.g., via engaging the handle 60 with an engagement portion of a gate control shaft associated with the first gates and rotating the handle 60). As a result, material flows from the first conduit connectors 46 to the first conduits. In addition, the second gates of the second metering system may be transitioned to the open position (e.g., via engaging the handle 60 with an engagement portion of a gate control shaft associated with the second gates and rotating the handle 60). As a result, material flows from the second conduit connectors of the second metering system to the second conduits. The first and second conduits may be coupled to respective row units (e.g., via headers, secondary distribution conduits, etc.). The row units may include two seed tubes, each configured to deposit a respective material into the soil. Accordingly, two seed meters may control flow of two separate materials (or the same material) to each row unit or each group of row units.

Figure 4:
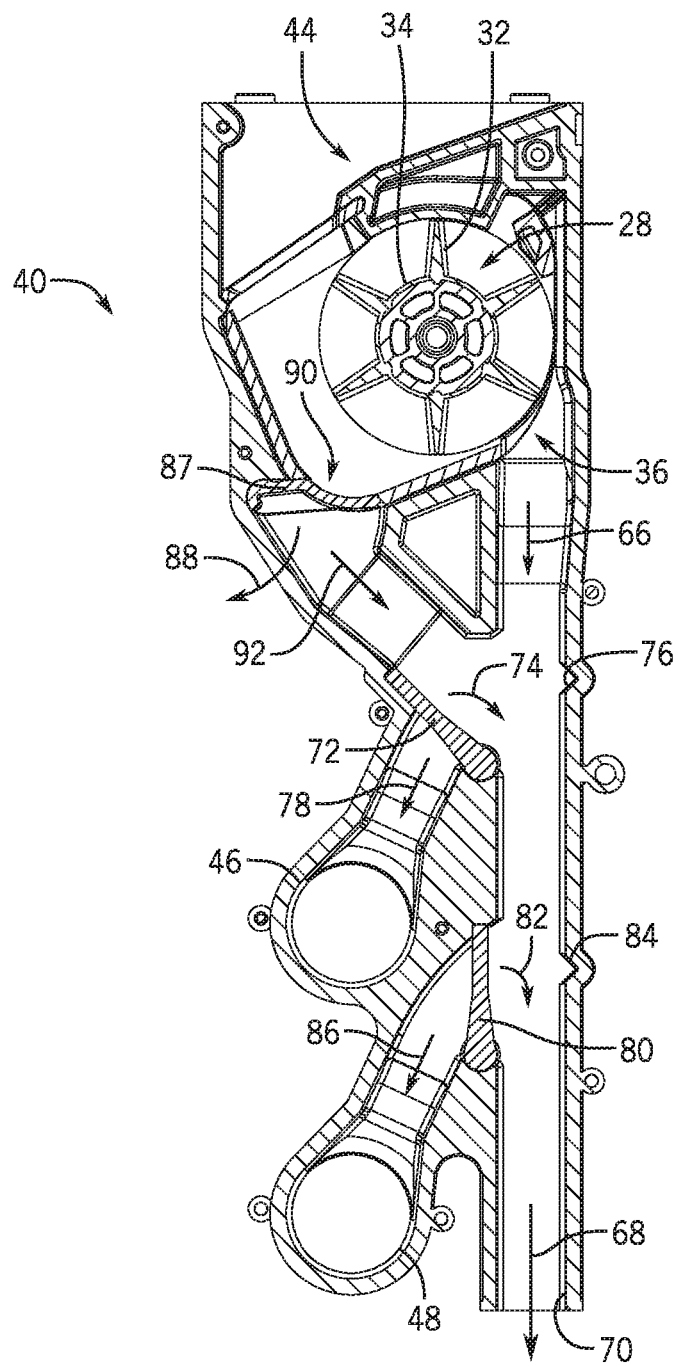
FIG. 4 is a cross-sectional view of an embodiment of a seed meter that may be employed within the metering system of FIG. 3.

FIG. 4 is a cross-sectional view of an embodiment of a seed meter 40 that may be employed within the metering system of FIG. 3. As previously discussed, the seed meter 40 includes a meter roller 28 configured to control a flow of particulate material into the first conduit connector 46 or into the second conduit connector 48 via rotation of the meter roller 28. To determine a relationship between meter roller rotation and particulate material flow rate (e.g., into the first conduit connection 46 or into the second conduit connection 48), the meter roller 28 may be calibrated (e.g., prior to operation of the air cart, periodically, etc.). The calibration process includes rotating the meter roller 28 through a desired number of rotations, weighing the particulate material output by the meter roller, and then dividing the material weight by the desired number of rotations to determine a product flow rate (e.g., product weight per meter roller rotation). For example, the meter roller 28 may be driven to rotate such that particulate material flows through the opening 36 in a direction 66. The material then exits the seed meter 40 in a direction 68 through an opening 70. An operator may collect the material output through the opening 70, weigh the material, and then determine the product flow rate (e.g., based on the number of meter roller rotations that produced the material output).

Once the calibration process is complete, the operator may open a first gate 72 to direct the material into the first conduit connector 46 (e.g., if material flow into the first conduits is desired). As illustrated, the first gate 72 may be rotated in a direction 74 from the illustrated closed position, which blocks flow into the first conduit connector 46, to an open position, which facilitates flow into the first conduit connector 46. With the first gate 72 in the open position, the gate 72 engages a recess 76 in the seed meter 40, thereby directing the flow of material from the direction 66 into the first conduit connector 46 in the direction 78 and blocking the flow of material through the opening 70. Upon completion of seeding operations, or if material flow into the second conduit connector 48 is desired, the first gate 72 may be returned to the closed position, as illustrated.

If material flow into the second conduits is desired, the operator may open a second gate 80 to direct the material into the second conduit connector 48. As illustrated, the second gate 80 may be rotated in a direction 82 from the illustrated closed position, which blocks flow into the second conduit connector 48, to an open position, which facilitates flow into the second conduit connector 48. With the second gate 80 in the open position, the gate 80 engages a recess 84 in the seed meter 40, thereby directing the flow of material from the direction 66 into the second conduit connector 48 in the direction 86 and blocking the flow of material through the opening 70. Upon completion of seeding operations, or if material flow into the first conduit connector 46 is desired, the second gate 80 may be returned to the closed position, as illustrated.

Once seeding operations are complete, a seed gate positioned above the inlet 44 may be transitioned to a closed position to block seed flow into the seed meter 40. The material remaining in the seed meter 40 may then be discharged via a clean-out process. The clean-out process includes closing the first and second gates 72 and 80, and then opening a third gate 87. As illustrated, the third gate 87 may be rotated in a direction 88 from the illustrated closed position, which blocks material from bypassing the meter roller 28, to an open position, which establishes an opening 90. The opening 90 enables material to bypass the meter roller 28 and flow in a direction 92 toward the opening 70, thereby discharging the remaining material from the seed meter 40. As previously discussed, it is desirable to transition the first gate 72 and the second gate 80 to the closed position prior to opening the third gate 87 such that the remaining particulate material does not enter the first conduit connector 46 or the second conduit connector 48. Accordingly, as discussed in detail below, the flow control assembly includes a locking assembly configured to substantially reduce or eliminate the possibility of having multiple gates in the open position.

Figure 5:
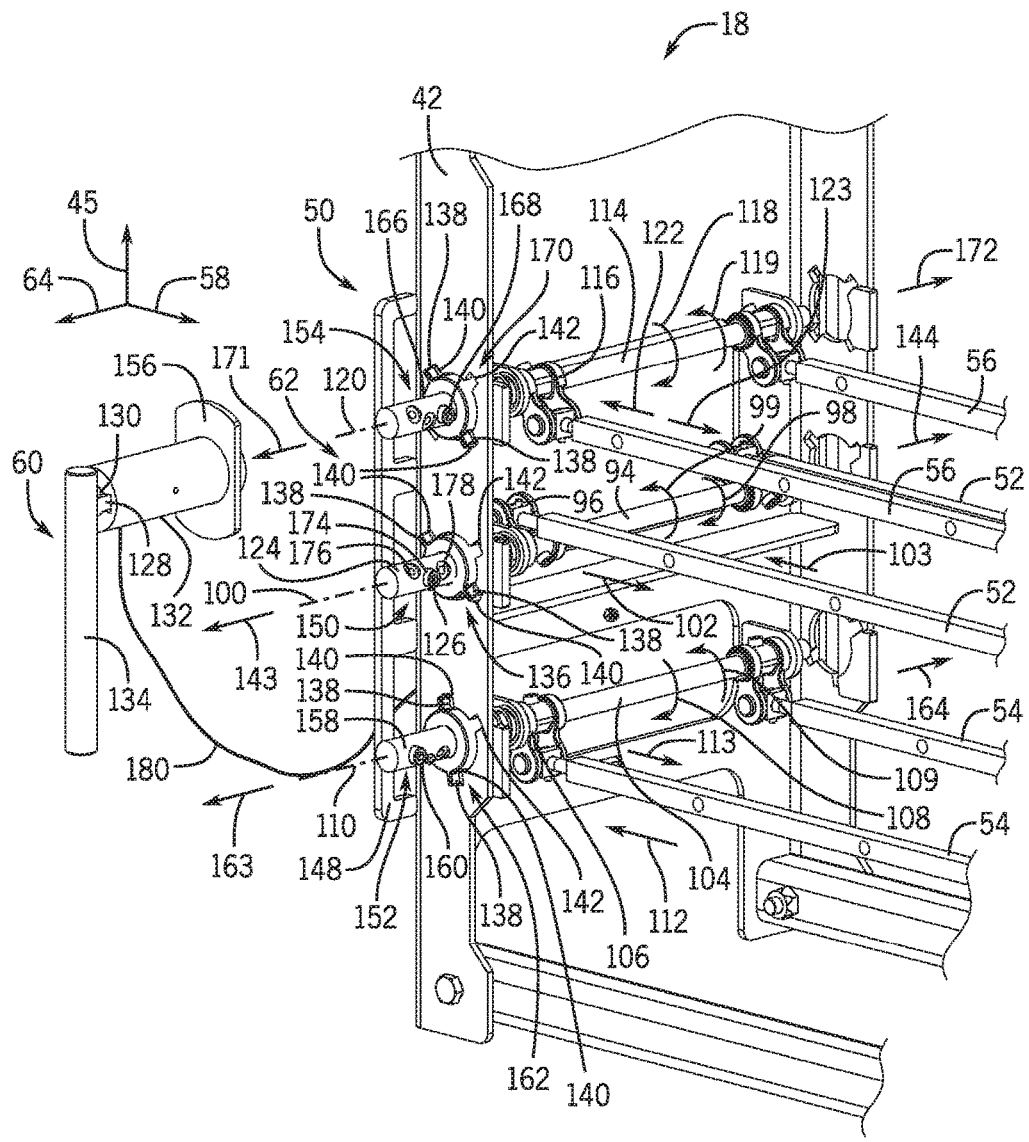
FIG. 5 is a front perspective view of a portion of the metering system of FIG. 3, including a handle configured to interface with three gate control shafts.

FIG. 5 is a front perspective view of a portion of the metering system 18 of FIG. 3, including the handle 60 configured to interface with three gate control shafts. As previously discussed, the flow control assembly 50 includes a first gate control rod 52 coupled to each of the first gates of the seed meters. The first gate control rod 52 is configured to move the first gates between the open position and the closed position, e.g., via translation of the rod 52 along the lateral axis 58. Because each first gate is coupled to the first gate control rod 52, the first gates open and close substantially concurrently. In the illustrated embodiment, the first gate control rod 52 is coupled to a first gate control shaft 94 by a first linkage 96. The first gate control shaft 94 is configured to drive the first gate control rod 52 to move the first gates via rotation of the shaft 94. For example, as illustrated, the gate control rod 52 is in a position corresponding to the closed position of the first gates. Rotation of the first gate control shaft 94 in a direction 98 about a rotation axis 100 of the shaft 94 drives the first gate control rod 52 to move in a direction 102, thereby moving the first gates to the open position. Conversely, with the first gate control rod 52 in a position corresponding to the open position of the first gates, rotation of the first gate control shaft 94 in a direction 99, opposite the direction 98, about the rotation axis 100 drives the first gate control rod 52 to move in a direction 103, thereby moving the first gates to the closed position.

In addition, the flow control assembly 50 includes a second gate control rod 54 coupled to each of the second gates of the seed meters. The second gate control rod 54 is configured to move the second gates between the open position and the closed position, e.g., via translation of the rod 54 along the lateral axis 58. Because each second gate is coupled to the second gate control rod 54, the second gates open and close substantially concurrently. In the illustrated embodiment, the second gate control rod 54 is coupled to a second gate control shaft 104 by a second linkage 106. The second gate control shaft 104 is configured to drive the second gate control rod 54 to move the second gates via rotation of the shaft 104. For example, as illustrated, the gate control rod 54 is in a position corresponding to the closed position of the second gates. Rotation of the second gate control shaft 104 in a direction 108 about a rotation axis 110 of the shaft 104 drives the second gate control rod 54 to move in a direction 112, thereby moving the second gates to the open position. Conversely, with the second gate control rod 54 in a position corresponding to the open position of the second gates, rotation of the second gate control shaft 104 in a direction 109, opposite the direction 108, about the rotation axis 110 drives the second gate control rod 54 to move in a direction 113, thereby moving the second gates to the closed position.

Furthermore, the flow control assembly 50 includes a third gate control rod 56 coupled to each of the third gates of the seed meters. The third gate control rod 56 is configured to move the third gates between the open position and the closed position, e.g., via translation of the rod 56 along the lateral axis 58. Because each third gate is coupled to the third gate control rod 56, the third gates open and close substantially concurrently. In the illustrated embodiment, the third gate control rod 56 is coupled to a third gate control shaft 114 by a third linkage 116. The third gate control shaft 114 is configured to drive the third gate control rod 56 to move the third gates via rotation of the shaft 114. For example, as illustrated, the gate control rod 56 is in a position corresponding to the closed position of the third gates. Rotation of the third gate control shaft 114 in a direction 118 about a rotation axis 120 of the shaft 114 drives the third gate control rod 56 to move in a direction 122, thereby moving the third gates to the open position. Conversely, with the third gate control rod 56 in a position corresponding to the open position of the third gates, rotation of the third gate control shaft 114 in a direction 119, opposite the direction 118, about the rotation axis 120 drives the third gate control rod 56 to move in a direction 123, thereby moving the third gates to the closed position.

The flow control assembly 50 also includes a handle 60 configured to drive each gate control shaft to rotate. In the illustrated embodiment, the first gate control shaft 94 includes a first engagement portion 124 configured to receive the handle 60. The first engagement portion 124 includes a protrusion 126 configured to engage a recess 128 within the handle 60 to non-rotatably couple the handle 60 to the first engagement portion 124. As illustrated, the recess 128 extends long a cavity 130 of an engagement portion 132 of the handle 60. To non-rotatably couple the handle 60 to the first gate control shaft 94, the cavity 130 of the handle 60 is aligned with the first engagement portion 124, and the handle 60 is oriented such that the recess 128 is aligned with the protrusion. The handle 60 is then translated in the longitudinal direction until the first engagement portion 124 is disposed within the cavity 130. While one protrusion 126 and one recess 128 are shown in the illustrated embodiment, it should be appreciated that more protrusions 126 and/or recesses 128 may be included in alternative embodiments. For example, in certain embodiments, the handle 60 may include two recesses 128 and the first engagement portion 124 may include two protrusions 126.

To facilitate alignment of the recess 128 with the protrusion 126, a circumferential position of the protrusion 126 on the first engagement portion 124 may be particularly selected such that a grip portion 134 of the handle 60 is substantially parallel to the vertical axis 45 while the first gate control shaft 94 is in an orientation corresponding to the closed position of the first gates and the handle 60 is engaged with the first engagement portion 124. Accordingly, to non-rotatably couple the handle 60 to the first gate control shaft 94, the handle 60 may be oriented such that the grip portion 134 is substantially parallel to the vertical axis 45, and then the handle 60 may be engaged with the first engagement portion 124. Because the recess 128 may be aligned with the protrusion by rotating the grip portion 134 of the handle 60 to a substantially vertical orientation, the duration associated with coupling the handle 60 to the first engagement portion 124 may be substantially reduced, as compared to a process that includes manual (e.g., visual) alignment of the protrusion 126 and the recess 128.

In the illustrated embodiment, a first engagement feature 136 is non-rotatably coupled to the first gate control shaft 94 and movable along the first gate control shaft 94. The first engagement feature 136 is configured to block rotation of the first gate control shaft 94 while the first engagement feature 136 is engaged and to facilitate rotation of the first gate control shaft 94 while the first engagement feature 136 is disengaged. As illustrated, the first engagement feature 136 includes two protrusions 138 configured to engage corresponding first recesses 140 or corresponding second recesses 142 within the fame 42 while the first engagement feature 136 is engaged. As discussed in detail below, the flow control assembly 50 includes a biasing member, such as a spring, configured to urge the first engagement feature 136 in a direction 143 (e.g., parallel to the longitudinal axis 64) relative to the first gate control shaft 94 to drive the protrusions 138 into the first recesses 140 or the second recesses 142. With the first gate control shaft 94 in an orientation corresponding to the closed position of the first gates, as illustrated, the protrusions 138 engage the first recesses 140, thereby blocking rotation of the shaft 94 in the directions 98 and 99. As a result, the first gates are maintained in the closed position.

To disengage the first engagement feature 136, the first engagement feature 136 is translated in a direction 144 (e.g., parallel to the longitudinal axis 64) against the spring bias, thereby extracting the protrusions 138 from the recesses 140 and enabling the first gate control shaft 94 to rotate. For example, with the first gate control shaft 94 in an orientation corresponding to the closed position of the first gates, as illustrated, the handle 60 is engaged with the first engagement portion 124. An operator may then apply a force to the handle 60 in the direction 144, thereby translating the first engagement feature 136 in the direction 144 and extracting the protrusions 138 from the recesses 140. The operator may then rotate the handle 60 in the direction 98, which drives the first gate control rod 52 in the direction 102, thereby transitioning the first gates toward the open position. With the first gates in the open position, the first gate control shaft 94 is oriented such that the protrusions 138 are aligned with the second recesses 142. With the protrusions 138 aligned with the recesses 142, the biasing member drives the first engagement feature 136 in the direction 143 (e.g., parallel to the longitudinal axis 64), thereby engaging the protrusions 138 with the second recesses 142 and blocking rotation of the first gate control shaft 94.

Similarly, to transition the first gates to the closed position, the operator may apply a force to the handle 60 in the direction 144 against the spring bias, thereby translating the first engagement feature 136 in the direction 144 and extracting the protrusions 138 from the second recesses 142. The operator may then rotate the handle 60 in the direction 99, which drives the first gate control rod 52 in the direction 103, thereby transitioning the first gates toward the closed position. With the first gates in the closed position, the first gate control shaft 94 is oriented such that the protrusions 138 are aligned with the first recesses 140. With the protrusions 138 aligned with the recesses 140, the biasing member (e.g., a spring) drives the first engagement feature 136 in the direction 143 (e.g., parallel to the longitudinal axis 64), thereby engaging the protrusions 138 with the first recesses 140 and blocking rotation of the first gate control shaft 94. The handle 60 may then be removed from the first engagement portion 124 (e.g., along the direction 143).

In the illustrated embodiment, the protrusions 138 and the recesses 140 and 142 are positioned such that the first engagement feature 136 is configured to engage only while the first gate control shaft 94 is in an orientation substantially corresponding to the open position of the first gates and in an orientation substantially corresponding to the closed position of the first gates. However, it should be appreciated that in alternative embodiments, additional recesses may be provided to facilitate engagement of the first engagement feature 136 while the first gate control shaft 94 is in other orientations. Moreover, while the illustrated first engagement feature 136 is configured to disengage via translation in the direction 144 relative to the first gate control shaft 94, it should be appreciated that, in alternative embodiments, the first engagement feature 136 may be configured to disengage via translation in the direction 143 (e.g., via pulling the handle in the direction 143).

As previously discussed, the flow control assembly 50 includes a locking assembly 62 configured to secure the handle 60 to each engagement portion at least while the respective gate control shaft is in an orientation corresponding to the open position of the respective gates. The locking assembly 62 is also configured to enable the handle 60 to be released from the respective engagement portion at least while the respective gate control shaft is in an orientation corresponding to the closed position of the respective gates. In the illustrated embodiment, the locking assembly 62 includes a locking bar 148 coupled to the frame 42 of the agricultural metering system. The locking bar 148 includes a first recess 150, a second recess 152, and a third recess 154. Each recess is configured to receive a locking plate 156 of the handle 60 at least while the handle 60 is in an orientation corresponding to the open position of the respective gates.

For example, with the handle 60 engaged with the first gate control shaft 94, rotation of the handle 60 in the direction 98 (e.g., toward an orientation that corresponds to the open position of the first gates) moves the locking plate 156 into engagement with the first recess 150. Contact between the locking plate 156 and the locking bar 148 blocks movement of the handle 60 away from the first engagement portion 124 in the direction 143, thereby securing the handle 60 to the first gate control shaft 94. Accordingly, unless the handle 60 is in an orientation that substantially corresponds to the closed position of the first gates, the handle 60 may not be removable from the first gate control shaft 94. As a result, multiple sets of gates (e.g., first gates and second gates, first gates and third gates, or second gates and third gates, etc.) may not be opened concurrently.

Similar to the first gate control shaft 94, the second gate control shaft 104 includes a second engagement portion 158 configured to receive the handle 60. The second engagement portion 158 includes a protrusion 160 configured to engage the recess 128 within the handle 60 to non-rotatably couple the handle 60 to the second engagement portion 158. To non-rotatably couple the handle 60 to the second gate control shaft 104, the cavity 130 of the handle 60 is aligned with the second engagement portion 158, and the handle 60 is oriented such that the recess 128 is aligned with the protrusion. The handle 60 is then translated in the longitudinal direction until the second engagement portion 158 is disposed within the cavity 130. While one protrusion 160 and one recess 128 are shown in the illustrated embodiment, it should be appreciated that more protrusions 160 and/or recesses 128 may be included in alternative embodiments. For example, in certain embodiments, the handle 60 may include two recesses 128 and the second engagement portion 158 may include two protrusions 160.

To facilitate alignment of the recess 128 with the protrusion 160, a circumferential position of the protrusion 160 on the second engagement portion 158 may be particularly selected such that the grip portion 134 of the handle 60 is substantially parallel to the vertical axis 45 while the second gate control shaft 104 is in an orientation corresponding to the closed position of the second gates and the handle 60 is engaged with the second engagement portion 158. Accordingly, to non-rotatably couple the handle 60 to the second gate control shaft 104, the handle 60 may be oriented such that the grip portion 134 is substantially parallel to the vertical axis 45, and then the handle 60 may be engaged with the second engagement portion 158. Because the recess 128 may be aligned with the protrusion by rotating the grip portion 134 of the handle 60 to a substantially vertical orientation, the duration associated with coupling the handle 60 to the second engagement portion 158 may be substantially reduced, as compared to a process that includes manual (e.g., visual) alignment of the protrusion 160 and the recess 128.

In the illustrated embodiment, a second engagement feature 162 is non-rotatably coupled to the second gate control shaft 104 and movable along the second gate control shaft 104. The second engagement feature 162 is configured to block rotation of the second gate control shaft 104 while the second engagement feature 162 is engaged and to facilitate rotation of the second gate control shaft 104 while the second engagement feature 162 is disengaged. As illustrated, the second engagement feature 162 includes two protrusions 138 configured to engage corresponding first recesses 140 or corresponding second recesses 142 within the fame 42 while the second engagement feature 162 is engaged. As discussed in detail below, the flow control assembly 50 includes a biasing member, such as a spring, configured to urge the second engagement feature 162 in a direction 163 (e.g., parallel to the longitudinal axis 64) relative to the second gate control shaft 104 to drive the protrusions 138 into the first recesses 140 or the second recesses 142. With the second gate control shaft 104 in an orientation corresponding to the closed position of the second gates, as illustrated, the protrusions 138 engage the first recesses 140, thereby blocking rotation of the shaft 104 in the directions 108 and 109. As a result, the second gates are maintained in the closed position.

To disengage the second engagement feature 162, the second engagement feature 162 is translated in a direction 164 (e.g., parallel to the longitudinal axis 64) against the spring bias, thereby extracting the protrusions 138 from the recesses 140 and enabling the second gate control shaft 104 to rotate. For example, with the second gate control shaft 104 in an orientation corresponding to the closed position of the second gates, as illustrated, the handle 60 is engaged with the second engagement portion 158. An operator may then apply a force to the handle 60 in the direction 164, thereby translating the second engagement feature 162 in the direction 164 and extracting the protrusions 138 from the recesses 140. The operator may then rotate the handle 60 in the direction 108, which drives the second gate control rod 54 in the direction 112, thereby transitioning the second gates toward the open position. With the second gates in the open position, the second gate control shaft 104 is oriented such that the protrusions 138 are aligned with the second recesses 142. With the protrusions 138 aligned with the recesses 142, the biasing member drives the second engagement feature 162 in the direction 163 (e.g., parallel to the longitudinal axis 64), thereby engaging the protrusions 138 with the second recesses 142 and blocking rotation of the second gate control shaft 104.

Similarly, to transition the second gates to the closed position, the operator may apply a force to the handle 60 in the direction 164 against the spring bias, thereby translating the second engagement feature 162 in the direction 164 and extracting the protrusions 138 from the second recesses 142. The operator may then rotate the handle 60 in the direction 109, which drives the second gate control rod 54 in the direction 113, thereby transitioning the second gates toward the closed position. With the second gates in the closed position, the second gate control shaft 104 is oriented such that the protrusions 138 are aligned with the first recesses 140. With the protrusions 138 aligned with the recesses 140, the biasing member (e.g., a spring) drives the second engagement feature 162 in the direction 163 (e.g., parallel to the longitudinal axis 64), thereby engaging the protrusions 138 with the first recesses 140 and blocking rotation of the second gate control shaft 104. The handle 60 may then be removed from the second engagement portion 158 (e.g., along the direction 163).

In the illustrated embodiment, the protrusions 138 and the recesses 140 and 142 are positioned such that the second engagement feature 162 is configured to engage only while the second gate control shaft 104 is in an orientation substantially corresponding to the open position of the second gates and in an orientation substantially corresponding to the closed position of the second gates. However, it should be appreciated that in alternative embodiments, additional recesses may be provided to facilitate engagement of the second engagement feature 162 while the second gate control shaft 104 is in other orientations. Moreover, while the illustrated second engagement feature 162 is configured to disengage via translation in the direction 164 relative to the second gate control shaft 104, it should be appreciated that, in alternative embodiments, the second engagement feature 162 may be configured to disengage via translation in the direction 163 (e.g., via pulling the handle in the direction 163).

Furthermore, with the handle 60 engaged with the second gate control shaft 104, rotation of the handle 60 in the direction 108 (e.g., toward an orientation that corresponds to the open position of the second gates) moves the locking plate 156 into engagement with the second recess 152. Contact between the locking plate 156 and the locking bar 148 blocks movement of the handle 60 away from the second engagement portion 158 in the direction 163, thereby securing the handle 60 to the second gate control shaft 104. Accordingly, unless the handle 60 is in an orientation that substantially corresponds to the closed position of the second gates, the handle 60 may not be removable from the second gate control shaft 104. As a result, multiple sets of gates (e.g., first gates and second gates, first gates and third gates, or second gates and third gates, etc.) may not be opened concurrently.

Similar to the first gate control shaft 94 and the second gate control shaft 104, the third gate control shaft 114 includes a third engagement portion 166 configured to receive the handle 60. The third engagement portion 166 includes a protrusion 168 configured to engage the recess 128 within the handle 60 to non-rotatably couple the handle 60 to the third engagement portion 166. To non-rotatably couple the handle 60 to the third gate control shaft 114, the cavity 130 of the handle 60 is aligned with the third engagement portion 166, and the handle 60 is oriented such that the recess 128 is aligned with the protrusion. The handle 60 is then translated in the longitudinal direction until the third engagement portion 166 is disposed within the cavity 130. While one protrusion 168 and one recess 128 are shown in the illustrated embodiment, it should be appreciated that more protrusions 168 and/or recesses 128 may be included in alternative embodiments. For example, in certain embodiments, the handle 60 may include two recesses 128 and the third engagement portion 166 may include two protrusions 168.

To facilitate alignment of the recess 128 with the protrusion 168, a circumferential position of the protrusion 168 on the third engagement portion 166 may be particularly selected such that the grip portion 134 of the handle 60 is substantially parallel to the vertical axis 45 while the third gate control shaft 114 is in an orientation corresponding to the closed position of the third gates and the handle 60 is engaged with the third engagement portion 166. Accordingly, to non-rotatably couple the handle 60 to the third gate control shaft 114, the handle 60 may be oriented such that the grip portion 134 is substantially parallel to the vertical axis 45, and then the handle 60 may be engaged with the third engagement portion 166. Because the recess 128 may be aligned with the protrusion by rotating the grip portion 134 of the handle 60 to a substantially vertical orientation, the duration associated with coupling the handle 60 to the third engagement portion 166 may be substantially reduced, as compared to a process that includes manual (e.g., visual) alignment of the protrusion 168 and the recess 128.

In the illustrated embodiment, a third engagement feature 170 is non-rotatably coupled to the third gate control shaft 114 and movable along the third gate control shaft 114. The third engagement feature 170 is configured to block rotation of the third gate control shaft 114 while the third engagement feature 170 is engaged and to facilitate rotation of the third gate control shaft 114 while the third engagement feature 170 is disengaged. As illustrated, the third engagement feature 170 includes two protrusions 138 configured to engage corresponding first recesses 140 or corresponding second recesses 142 within the fame 42 while the third engagement feature 170 is engaged. As discussed in detail below, the flow control assembly 50 includes a biasing member, such as a spring, configured to urge the third engagement feature 170 in a direction 171 (e.g., parallel to the longitudinal axis 64) to drive the protrusions 138 into the first recesses 140 or the second recesses 142. With the third gate control shaft 114 in an orientation corresponding to the closed position of the third gates, as illustrated, the protrusions 138 engage the first recesses 140, thereby blocking rotation of the shaft 114 in the directions 118 and 119. As a result, the third gates are maintained in the closed position.

To disengage the third engagement feature 170, the third engagement feature 170 is translated in a direction 172 (e.g., parallel to the longitudinal axis 64) against the spring bias, thereby extracting the protrusions 138 from the recesses 140 and enabling the third gate control shaft 114 to rotate. For example, with the third gate control shaft 114 in an orientation corresponding to the closed position of the third gates, as illustrated, the handle 60 is engaged with the third engagement portion 166. An operator may then apply a force to the handle 60 in the direction 172, thereby translating the third engagement feature 170 in the direction 172 and extracting the protrusions 138 from the recesses 140. The operator may then rotate the handle 60 in the direction 118, which drives the third gate control rod 56 in the direction 122, thereby transitioning the third gates toward the open position. With the third gates in the open position, the third gate control shaft 114 is oriented such that the protrusions 138 are aligned with the second recesses 142. With the protrusions 138 aligned with the recesses 142, the biasing member drives the third engagement feature 170 in the direction 171 (e.g., parallel to the longitudinal axis 64), thereby engaging the protrusions 138 with the second recesses 142 and blocking rotation of the third gate control shaft 114.

Similarly, to transition the third gates to the closed position, the operator may apply a force to the handle 60 in the direction 172 against the spring bias, thereby translating the third engagement feature 170 in the direction 172 and extracting the protrusions 138 from the second recesses 142. The operator may then rotate the handle 60 in the direction 119, which drives the third gate control rod 56 in the direction 123, thereby transitioning the third gates toward the closed position. With the third gates in the closed position, the third gate control shaft 114 is oriented such that the protrusions 138 are aligned with the first recesses 140. With the protrusions 138 aligned with the recesses 140, the biasing member (e.g., a spring) drives the third engagement feature 170 in the direction 171 (e.g., parallel to the longitudinal axis 64), thereby engaging the protrusions 138 with the first recesses 140 and blocking rotation of the third gate control shaft 114. The handle 60 may then be removed from the third engagement portion 166 (e.g., along the direction 171).

In the illustrated embodiment, the protrusions 138 and the recesses 140 and 142 are positioned such that the third engagement feature 170 is configured to engage only while the third gate control shaft 114 is in an orientation substantially corresponding to the open position of the third gates and in an orientation substantially corresponding to the closed position of the third gates. However, it should be appreciated that in alternative embodiments, additional recesses may be provided to facilitate engagement of the third engagement feature 170 while the third gate control shaft 114 is in other orientations. Moreover, while the illustrated third engagement feature 170 is configured to disengage via translation in the direction 172 relative to the third gate control shaft 114, it should be appreciated that, in alternative embodiments, the third engagement feature 170 may be configured to disengage via translation in the direction 171 (e.g., via pulling the handle in the direction 171).

Furthermore, with the handle 60 engaged with the third gate control shaft 114, rotation of the handle 60 in the direction 118 (e.g., toward an orientation that corresponds to the open position of the third gates) moves the locking plate 156 into engagement with the third recess 154. Contact between the locking plate 156 and the locking bar 148 blocks movement of the handle 60 away from the third engagement portion 166 in the direction 171, thereby securing the handle 60 to the third gate control shaft 114. Accordingly, unless the handle 60 is in an orientation that substantially corresponds to the closed position of the third gates, the handle 60 may not be removable from the third gate control shaft 114. As a result, multiple sets of gates (e.g., first gates and second gates, first gates and third gates, or second gates and third gates, etc.) may not be opened concurrently.

In the illustrated embodiment, a width of the recesses 150, 152, and 154 (i.e., the extent of the recess along the longitudinal axis 64) is configured to accommodate movement of the locking plate 156 along the longitudinal axis 64 as the handle moves in the longitudinal direction to disengage the respective engagement feature and in the opposite longitudinal direction as the respective engagement feature engages. In addition, the locking plate 156 and/or the locking bar 148 may be particularly configured to control the orientation at which the handle 60 is secured to each gate control shaft and/or the orientation at which the handle is removable from the gate control shaft. For example, the locking plate 156 and/or the locking bar 148 may be configured to secure the handle to a respective gate control shaft upon rotation of the handle to a desired angle from the orientation that corresponds to the closed position of the gates. In certain embodiments, the desired angle may be about 30 degrees, less than 30 degrees, less than 20 degrees, less than 15 degrees, less than 10 degrees, or less than 5 degrees, for example. Furthermore, while the illustrated locking bar 148 includes three recesses in the illustrated embodiment, it should be appreciated that the locking bar 148 may include more or fewer recesses in alternative embodiments. For example, the locking bar 148 may include a single recess that extends along the vertical extent of the locking bar.

In the illustrated embodiment, each engagement portion 124, 158, and 166 includes a first receptacle 174, a second receptacle 176, and a third receptacle 178. Each receptacle is configured to receive a respective protrusion, such as the first protrusion 126, the second protrusion 160, and the third protrusion 168. For example, each protrusion may include a threaded connector configured to engage a corresponding threaded connector of the receptacle, thereby securing the protrusion to the receptacle. As illustrated, the receptacles 174, 176, and 178 are circumferentially offset from one another. The circumferential position of the first receptacle 174 is particularly selected to position the first protrusion 126 in a desired orientation (e.g., an orientation that enables the grip portion 134 of the handle 60 to be substantially parallel to the vertical axis 45 while the first gate control shaft 94 is in an orientation corresponding to the closed position of the first gates). Similarly, the circumferential position of the second receptacle 176 is particularly selected to position the second protrusion 160 in a desired orientation (e.g., an orientation that enables the grip portion 134 of the handle 60 to be substantially parallel to the vertical axis 45 while the second gate control shaft 104 is in an orientation corresponding to the closed position of the second gates). In addition, the circumferential position of the third receptacle 178 is particularly selected to position the third protrusion 168 in a desired orientation (e.g., an orientation that enables the grip portion 134 of the handle 60 to be substantially parallel to the vertical axis 45 while the third gate control shaft 114 is in an orientation corresponding to the closed position of the third gates). By providing three receptacles at different circumferential positions, a single shaft configuration may be used for the first gate control shaft 94, the second gate control shaft 104, and the third gate control shaft 114. As a result, shaft manufacturing costs may be reduced as compared to producing three different shaft configurations, each with a protrusion in a different circumferential position.

In the illustrated embodiment, the handle 60 is coupled to the frame 42 of the agricultural metering system by a tether 180 to substantially reduce or eliminate the possibility of the handle becoming lost while disengaged from the engagement portions. Furthermore, in certain embodiments, other gate control links, such as belts or other suitable devices, may be used instead of the illustrated gate control rods 52, 54, and 56 to move the respective gates into the desired position in response to rotation of the gate control shafts. In addition, while a single set of gate control rods is described above, it should be appreciated that the flow control assembly 50 may include one or more additional gate control rods coupled to each gate control shaft. For example, in the illustrated embodiment, two first gate control rods 52 are coupled to the first gate control shaft 94, two second gate control rods 54 are coupled to the second gate control shaft 104, and two third gate control rods 56 are coupled to the third gate control shaft 114. The gate control rods of each pair are positioned on opposite longitudinal sides of the seed meters, and may be coupled to opposite longitudinal sides of each gate.

Figure 6:
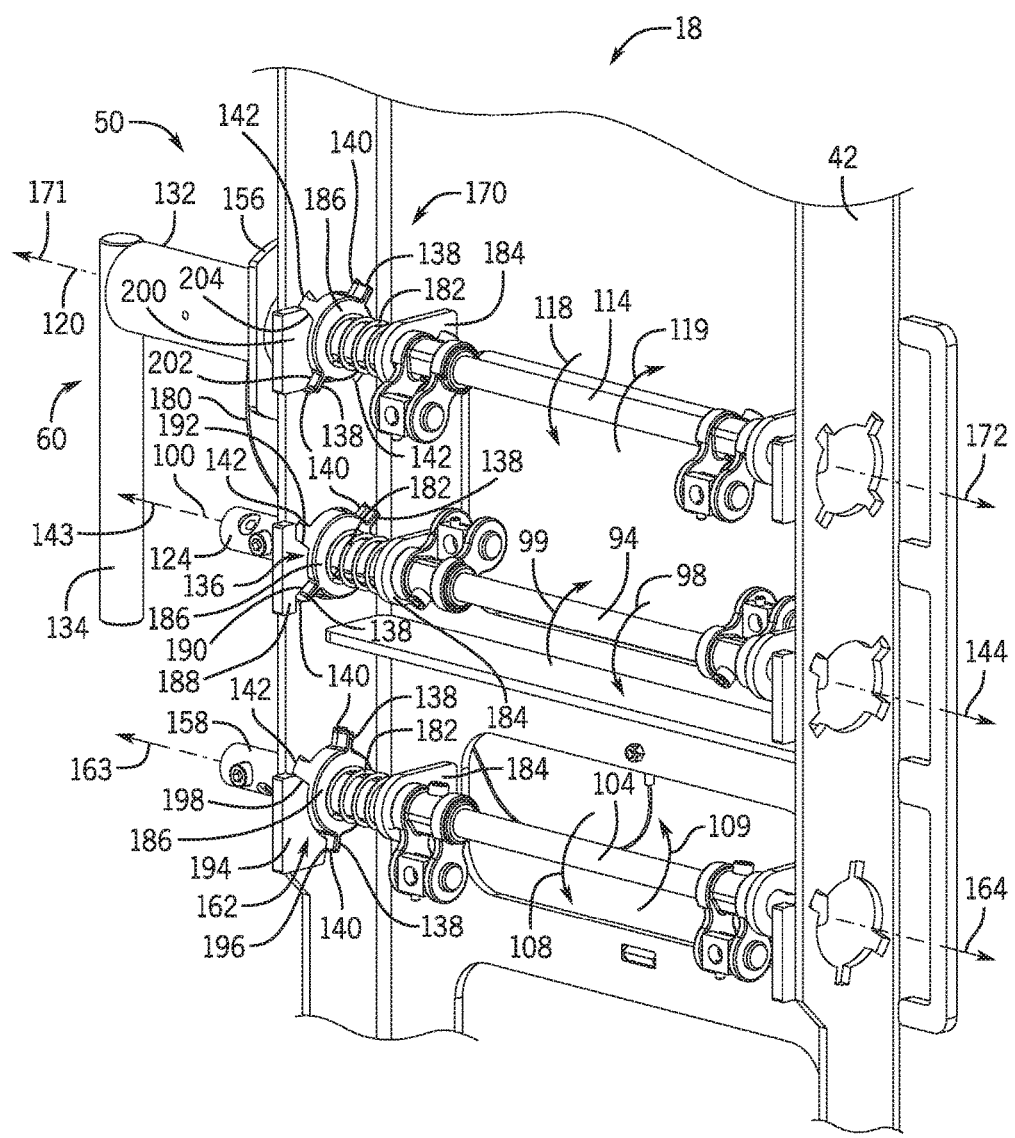
FIG. 6 is a rear perspective view of a portion of the metering system of FIG. 3, in which the handle is engaged with a gate control shaft.

FIG. 6 is a rear perspective view of a portion of the metering system 18 of FIG. 3, in which the handle 60 is engaged with the third gate control shaft 114. In the illustrated embodiment, the flow control assembly 50 includes a spring 182 configured to urge the first engagement feature 136 in the direction 143 to drive the protrusions 138 into the first recesses 140 or the second recesses 142. As illustrated, the spring 182 is disposed between a mount 184, which is configured to rotatably support the first gate control shaft 94 on the frame 42, and a contact surface 186 of the first engagement feature 136. As previously discussed, the first engagement feature 136 may be disengaged via translation in the direction 144 against the spring bias, thereby extracting the protrusions 138 from the recesses 140 and enabling the first gate control shaft 94 to rotate.

In addition, the flow control assembly 50 includes a spring 182 disposed between a mount 184, which is configured to rotatably support the second gate control shaft 104 on the frame 42, and a contact surface 186 of the second engagement feature 162. The second engagement feature 162 may be disengaged via translation in the direction 164 against the spring bias, thereby extracting the protrusions 138 from the recesses 140 and enabling the second gate control shaft 104 to rotate. Furthermore, the flow control assembly 50 includes a spring 182 disposed between a mount 184, which is configured to rotatably support the third gate control shaft 114 on the frame 42, and a contact surface 186 of the third engagement feature 170. The third engagement feature 170 may be disengaged via translation in the direction 172 against the spring bias, thereby extracting the protrusions 138 from the recesses 140 and enabling the third gate control shaft 114 to rotate. While the illustrated springs are coil springs, it should be appreciated that other spring configurations (e.g., leaf springs) may be employed in alternative embodiments. In addition, it should be appreciated that alternative biasing members, such as resilient material, may be disposed between the respective mount 184 and the respective contact surface 186 to urge the respective engagement feature in the longitudinal direction.

In the illustrated embodiment, the flow control assembly 50 includes a first stop 188 coupled to the frame 42. As illustrated, the first stop 188 includes a first contact surface 190 and a second contact surface 192. The first contact surface 190 is configured to contact one protrusion 138 while the first gate control shaft 94 is in an orientation that substantially corresponds to the closed position of the first gates to block rotation of the first gate control shaft 94 in the direction 99. In addition, the second contact surface 192 is configured to contact one protrusion 138 while the first gate control shaft 94 is in an orientation that substantially corresponds to the open position of the first gates to block rotation of the first gate control shaft 94 in the direction 98. Accordingly, the first stop 188 may substantially reduce or eliminate the possibility of moving the gates beyond a desired range of motion (e.g., between the open position and the closed position).

The flow control assembly 50 includes a second stop 194 coupled to the frame 42. As illustrated, the second stop 194 includes a first contact surface 196 and a second contact surface 198. The first contact surface 196 is configured to contact one protrusion 138 while the second gate control shaft 104 is in an orientation that substantially corresponds to the closed position of the second gates to block rotation of the second gate control shaft 104 in the direction 109. In addition, the second contact surface 198 is configured to contact one protrusion 138 while the second gate control shaft 104 is in an orientation that substantially corresponds to the open position of the second gates to block rotation of the second gate control shaft 104 in the direction 108. Accordingly, the second stop 194 may substantially reduce or eliminate the possibility of moving the gates beyond a desired range of motion (e.g., between the open position and the closed position).

Furthermore, the flow control assembly 50 includes a third stop 200 coupled to the frame 42. As illustrated, the third stop 200 includes a first contact surface 202 and a second contact surface 204. The first contact surface 202 is configured to contact one protrusion 138 while the third gate control shaft 114 is in an orientation that substantially corresponds to the closed position of the third gates to block rotation of the third gate control shaft 114 in the direction 119. In addition, the second contact surface 204 is configured to contact one protrusion 138 while the third gate control shaft 114 is in an orientation that substantially corresponds to the open position of the third gates to block rotation of the third gate control shaft 114 in the direction 118. Accordingly, the third stop 200 may substantially reduce or eliminate the possibility of moving the gates beyond a desired range of motion (e.g., between the open position and the closed position).

Figure 7:
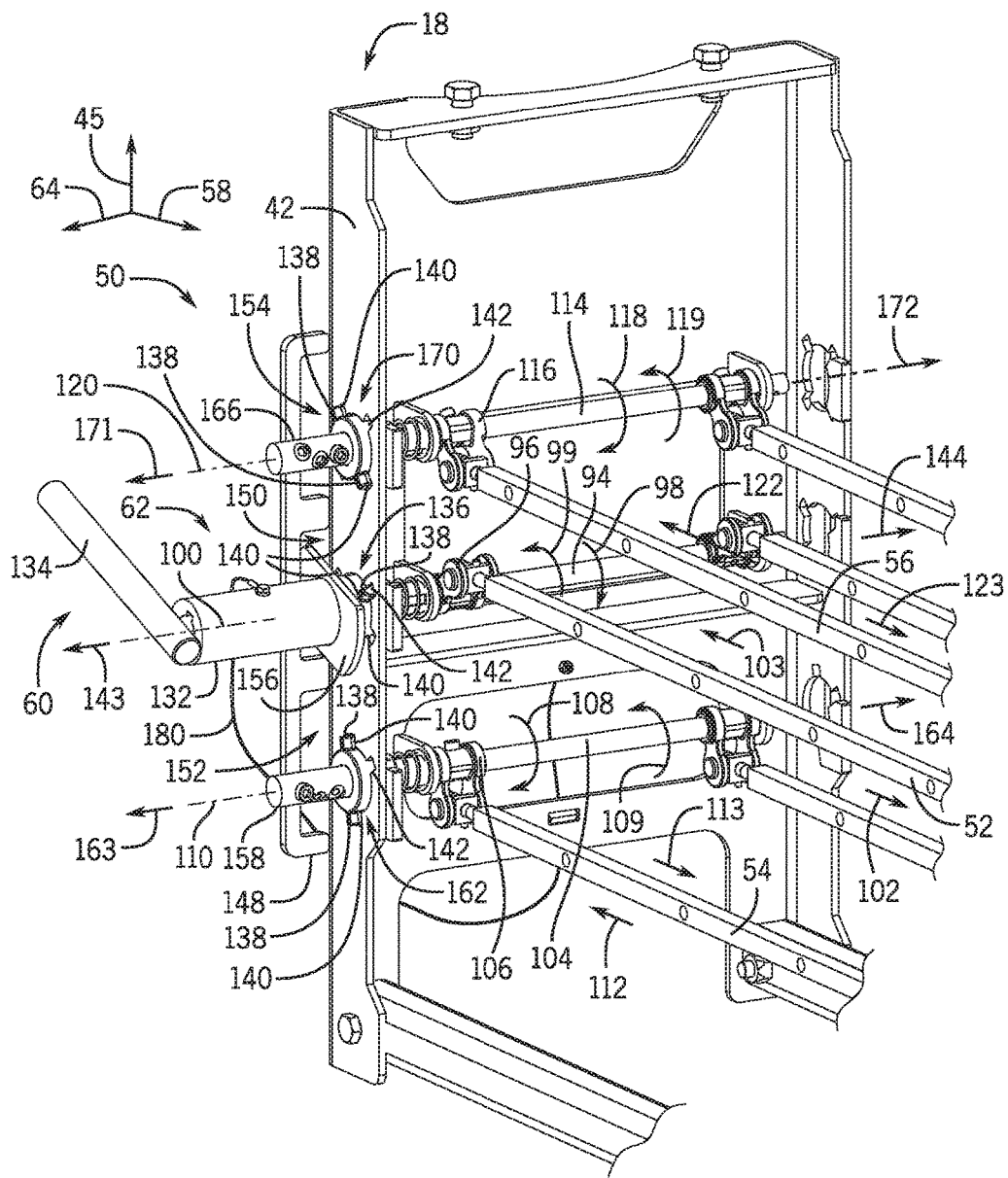
FIG. 7 is a front perspective view of a portion of the metering system of FIG. 3, in which the handle is engaged with a first gate control shaft and rotated to a locked position.

FIG. 7 is a front perspective view of a portion of the metering system of FIG. 3, in which the handle 60 is engaged with the first gate control shaft 94 and rotated to a locked position. As illustrated, the handle 60 is rotated such that the first gate control shaft 94 is in an orientation that substantially corresponds to the open position of the first gates. Accordingly, the protrusions 138 are engaged with the second recesses 142 such that rotation of the first gate control shaft 94 in the directions 98 and 99 is blocked. In addition, the locking plate 156 of the handle 60 is engaged with the first recess 150. Contact between the locking plate 156 and the locking bar 148 blocks movement of the handle 60 away from the first engagement portion 124 in the direction 143, thereby securing the handle 60 to the first gate control shaft 94. Accordingly, the handle 60 is not removable from the first gate control shaft 94. As a result, the handle 60 may not be engaged with another gate control shaft, thereby substantially reducing or eliminating the possibility of opening another set of gates while the first gates are in the open position.

To close the first gates, a force is applied to the handle 60 in the direction 144, thereby driving the first engagement feature 136 in the direction 144 and disengaging the protrusions 138 from the second recesses 142. The handle 60 may then be rotated in the direction 99 until one protrusion contacts the first stop and the protrusions 138 are aligned with the first recesses 140 (e.g., until the handle 60 is in an orientation that substantially corresponds to the closed position of the first gates). The spring may then drive the protrusions 138 into the first recesses 140, thereby blocking rotation of the first gate control shaft 94. With the handle 60 in the orientation that substantially corresponds to the closed position of the first gates, the locking plate 156 is disengaged from the first recess 150. Accordingly, the handle may be removed from the first engagement portion 124 and used to open another set of gates.

Figure 8:
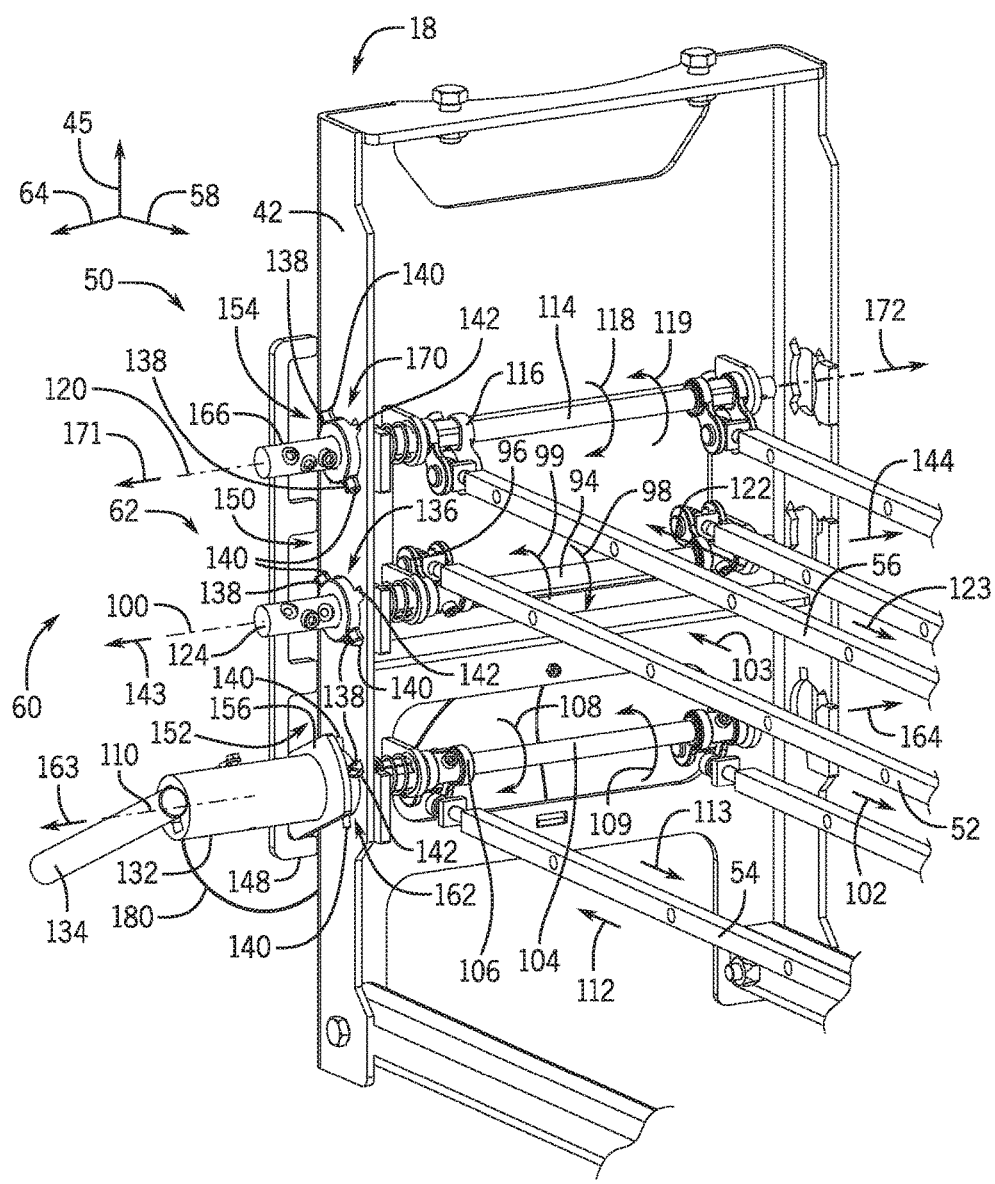
FIG. 8 is a front perspective view of a portion of the metering system of FIG. 3, in which the handle is engaged with a second gate control shaft and rotated to a locked position.

FIG. 8 is a front perspective view of a portion of the metering system of FIG. 3, in which the handle 60 is engaged with the second gate control shaft 104 and rotated to a locked position. As illustrated, the handle 60 is rotated such that the second gate control shaft 104 is in an orientation that substantially corresponds to the open position of the second gates. Accordingly, the protrusions 138 are engaged with the second recesses 142 such that rotation of the second gate control shaft 104 in the directions 108 and 109 is blocked. In addition, the locking plate 156 of the handle 60 is engaged with the second recess 152. Contact between the locking plate 156 and the locking bar 148 blocks movement of the handle 60 away from the second engagement portion 158 in the direction 163, thereby securing the handle 60 to the second gate control shaft 104. Accordingly, the handle 60 is not removable from the second gate control shaft 104. As a result, the handle 60 may not be engaged with another gate control shaft, thereby substantially reducing or eliminating the possibility of opening another set of gates while the second gates are in the open position.

To close the second gates, a force is applied to the handle 60 in the direction 164, thereby driving the second engagement feature 162 in the direction 164 and disengaging the protrusions 138 from the second recesses 142. The handle 60 may then be rotated in the direction 109 until one protrusion contacts the second stop and the protrusions 138 are aligned with the first recesses 140 (e.g., until the handle 60 is in an orientation that substantially corresponds to the closed position of the second gates). The spring may then drive the protrusions 138 into the first recesses 140, thereby blocking rotation of the second gate control shaft 104. With the handle 60 in the orientation that substantially corresponds to the closed position of the second gates, the locking plate 156 is disengaged from the second recess 152. Accordingly, the handle may be removed from the second engagement portion 158 and used to open another set of gates.

Figure 9:
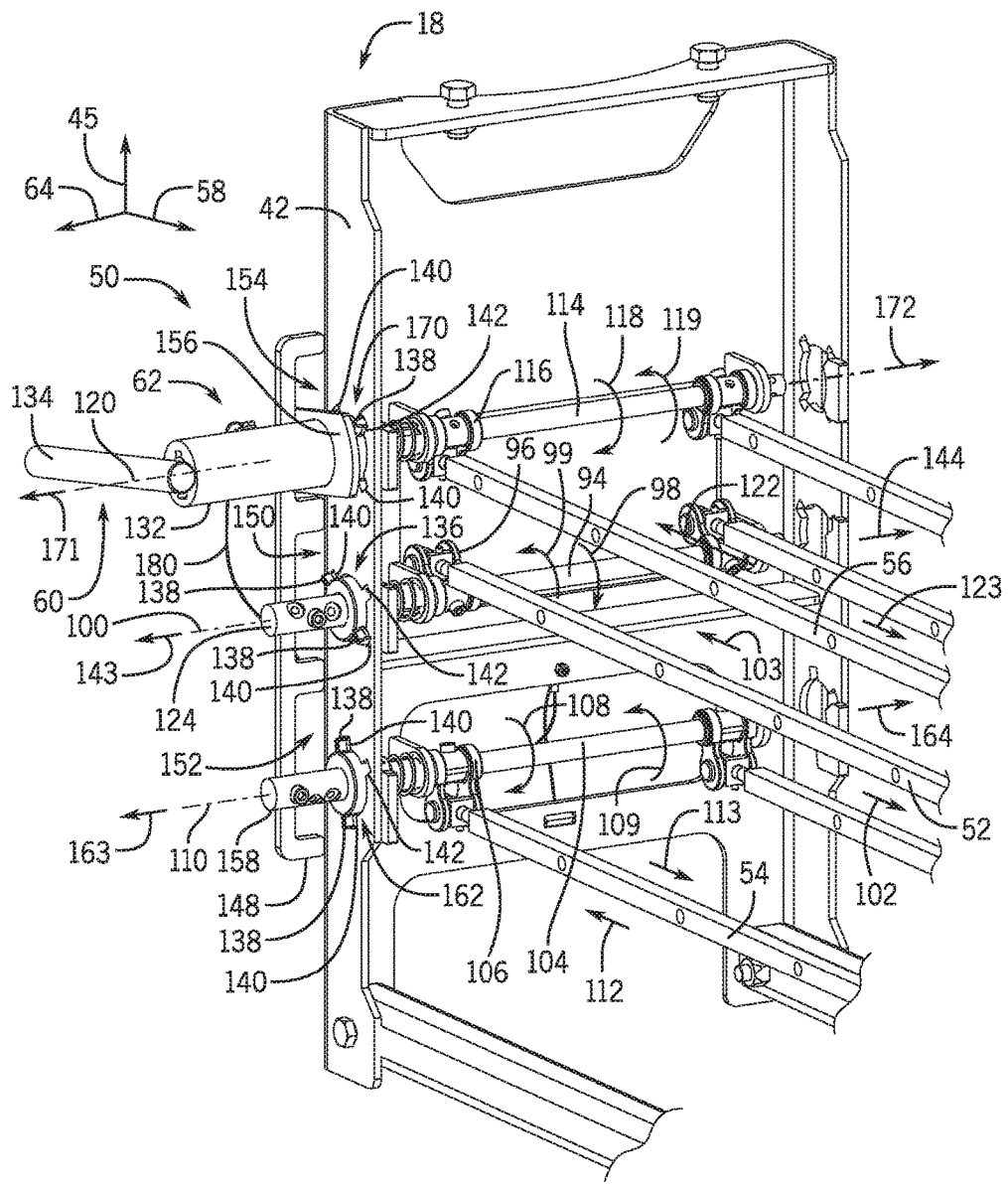
FIG. 9 is a front perspective view of a portion of the metering system of FIG. 3, in which the handle is engaged with a third gate control shaft and rotated to a locked position.

FIG. 9 is a front perspective view of a portion of the metering system of FIG. 3, in which the handle 60 is engaged with the third gate control shaft 114 and rotated to a locked position. As illustrated, the handle 60 is rotated such that the third gate control shaft 114 is in an orientation that substantially corresponds to the open position of the third gates. Accordingly, the protrusions 138 are engaged with the second recesses 142 such that rotation of the third gate control shaft 114 in the directions 118 and 119 is blocked. In addition, the locking plate 156 of the handle 60 is engaged with the third recess 154. Contact between the locking plate 156 and the locking bar 148 blocks movement of the handle 60 away from the third engagement portion 166 in the direction 171, thereby securing the handle 60 to the third gate control shaft 114. Accordingly, the handle 60 is not removable from the third gate control shaft 114. As a result, the handle 60 may not be engaged with another gate control shaft, thereby substantially reducing or eliminating the possibility of opening another set of gates while the third gates are in the open position.

To close the third gates, a force is applied to the handle 60 in the direction 172, thereby driving the third engagement feature 170 in the direction 172 and disengaging the protrusions 138 from the second recesses 142. The handle 60 may then be rotated in the direction 119 until one protrusion contacts the third stop and the protrusions 138 are aligned with the first recesses 140 (e.g., until the handle 60 is in an orientation that substantially corresponds to the closed position of the third gates). The spring may then drive the protrusions 138 into the first recesses 140, thereby blocking rotation of the third gate control shaft 114. With the handle 60 in the orientation that substantially corresponds to the closed position of the third gates, the locking plate 156 is disengaged from the third recess 154. Accordingly, the handle may be removed from the third engagement portion 166 and used to open another set of gates.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A flow control assembly for an agricultural metering system, comprising:
    a first gate control shaft configured to drive a first gate of
        a seed meter to transition between an open position and
        a closed position via rotation of the first gate control
        shaft;

a second gate control shaft configured to drive a second gate of the seed meter to transition between an open position and a closed position via rotation of the second gate control shaft;

a handle configured to selectively engage each of a first engagement portion of the first gate control shaft and a second engagement portion of the second gate control shaft, wherein the handle is configured to drive the first gate control shaft to rotate via rotation of the handle between a first position that corresponds to the open position of the first gate and a second position that corresponds to the closed position of the first gate while the handle is engaged with the first engagement portion, and the handle is configured to drive the second gate control shaft to rotate via rotation of the handle between a third position that corresponds to the open position of the second gate and a fourth position that corresponds to the closed position of the second gate while the handle is engaged with the second engagement portion; and a locking assembly configured to secure the handle to the first engagement portion at least while the handle is in the first position, to enable the handle to be released from the first engagement portion at least while the handle is in the second position, to secure the handle to the second engagement portion at least while the handle is in the third position, and to enable the handle to be released from the second engagement portion at least while the handle is in the fourth position.

2. The flow control assembly of claim 1, wherein the handle comprises at least one recess configured to engage a corresponding first protrusion on the first engagement portion and a corresponding second protrusion on the second engagement portion to non-rotatably couple the handle to a respective engagement portion while the handle is engaged with the respective engagement portion.

3. The flow control assembly of claim 2, wherein each engagement portion comprises a first receptacle and a second receptacle each configured to receive a respective protrusion, the first protrusion is coupled to the first receptacle on the first engagement portion, the second protrusion is coupled to the second receptacle on the second engagement portion, the first receptacle is positioned such that a grip portion of the handle is oriented at a desired angle while the handle is in the second position, and the second receptacle is positioned such that the grip portion is oriented at the desired angle while the handle is in the fourth position.

4. The flow control assembly of claim 1, comprising a stop configured to block rotation of the handle away from the second position while the handle is in the first position, to block rotation of the handle away from the first position while the handle is in the second position, to block rotation of the handle away from the fourth position while the handle is in the third position, or to block rotation of the handle away from the third position while the handle is in the fourth position.

5. The flow control assembly of claim 1, wherein the locking assembly comprises a locking bar coupled to a frame of the agricultural metering system, wherein the locking bar comprises at least one recess configured to selectively receive a locking plate of the handle at least while the handle is in the first position and the third position to secure the handle to a respective engagement portion.

6. The flow control assembly of claim 5, wherein the at least one recess comprises a first recess configured to receive the locking plate at least while the handle is in the first position and a second recess configured to receive the locking plate at least while the handle is in the third position.

7. The flow control assembly of claim 1, comprising:
a first gate control link coupled to the first gate control shaft, wherein the first gate control link is configured to couple to the first gate of the seed meter, and the first gate control link is configured to move the first gate between the open position and the closed position in response to rotation of the first gate control shaft; and a second gate control link coupled to the second gate control shaft, wherein the second gate control link is configured to couple to the second gate of the seed meter, and the second gate control link is configured to move the second gate between the open position and the closed position in response to rotation of the second gate control shaft.

8. The flow control assembly of claim 1, comprising:
a first engagement feature non-rotatably coupled to the first gate control shaft and movable along the first gate control shaft, wherein the first engagement feature is configured to block rotation of the first gate control shaft while the first engagement feature is engaged and to facilitate rotation of the first gate control shaft while the first engagement feature is disengaged, and the first engagement feature is configured to disengage via translation in a longitudinal direction relative to the first gate control shaft; and a second engagement feature non-rotatably coupled to the second gate control shaft and movable along the second gate control shaft, wherein the second engagement feature is configured to block rotation of the second gate control shaft while the second engagement feature is engaged and to facilitate rotation of the second gate control shaft while the second engagement feature is disengaged, and the second engagement feature is configured to disengage via translation in the longitudinal direction relative to the second gate control shaft.

9. A flow control assembly for an agricultural metering system, comprising:
a first gate control shaft configured to drive a first gate of a seed meter to transition between an open position and a closed position via rotation of the first gate control shaft;

a second gate control shaft configured to drive a second gate of the seed meter to transition between an open position and a closed position via rotation of the second gate control shaft;

a third gate control shaft configured to drive a third gate of the seed meter to transition between an open position and a closed position via rotation of the third gate control shaft;

a handle configured to selectively engage each of a first engagement portion of the first gate control shaft, a second engagement portion of the second gate control shaft, and a third engagement portion of the third gate control shaft, wherein the handle is configured to drive the first gate control shaft to rotate via rotation of the handle between a first position that corresponds to the open position of the first gate and a second position that corresponds to the closed position of the first gate while the handle is engaged with the first engagement portion, the handle is configured to drive the second gate control shaft to rotate via rotation of the handle between a third position that corresponds to the open position of the second gate and a fourth position that corresponds to the closed position of the second gate while the handle is engaged with the second engagement portion, and the handle is configured to drive the third gate control shaft to rotate via rotation of the handle between a fifth position that corresponds to the open position of the third gate and a sixth position that corresponds to the closed position of the third gate; and a locking assembly configured to secure the handle to the first engagement portion at least while the handle is in the first position, to enable the handle to be released from the first engagement portion at least while the handle is in the second position, to secure the handle to the second engagement portion at least while the handle is in the third position, to enable the handle to be released from the second engagement portion at least while the handle is in the fourth position, to secure the handle to the third engagement portion at least while the handle is in the fifth position, and to enable the handle to be released from the third engagement portion at least while the handle is in the sixth position.

10. The flow control assembly of claim 9, wherein the handle comprises at least one recess configured to engage a corresponding first protrusion on the first engagement portion, a corresponding second protrusion on the second engagement portion, and a corresponding third protrusion on the third engagement portion to non-rotatably couple the handle to a respective engagement portion while the handle is engaged with the respective engagement portion.

11. The flow control assembly of claim 9, comprising a stop configured to block rotation of the handle away from the second position while the handle is in the first position, to block rotation of the handle away from the first position while the handle is in the second position, to block rotation of the handle away from the fourth position while the handle is in the third position, to block rotation of the handle away from the third position while the handle is in the fourth position, to block rotation of the handle away from the sixth position while the handle is in the fifth position, or to block rotation of the handle away from the fifth position while the handle is in the sixth position.

12. The flow control assembly of claim 9, wherein the locking assembly comprises a locking bar coupled to a frame of the agricultural metering system, wherein the locking bar comprises at least one recess configured to selectively receive a locking plate of the handle at least while the handle is in the first position, the third position, and the fifth position to secure the handle to a respective engagement portion.

13. The flow control assembly of claim 12, wherein the at least one recess comprises a first recess configured to receive the locking plate at least while the handle is in the first position, a second recess configured to receive the locking plate at least while the handle is in the third position, and a third recess configured to receive the locking plate at least while the handle is in the fifth position.

14. The flow control assembly of claim 9, comprising:
a first engagement feature non-rotatably coupled to the first gate control shaft and movable along the first gate control shaft, wherein the first engagement feature is configured to block rotation of the first gate control shaft while the first engagement feature is engaged and to facilitate rotation of the first gate control shaft while the first engagement feature is disengaged, and the first engagement feature is configured to disengage via translation in a longitudinal direction relative to the first gate control shaft;

a second engagement feature non-rotatably coupled to the second gate control shaft and movable along the second gate control shaft, wherein the second engagement feature is configured to block rotation of the second gate control shaft while the second engagement feature is engaged and to facilitate rotation of the second gate control shaft while the second engagement feature is disengaged, and the second engagement feature is configured to disengage via translation in the longitudinal direction relative to the second gate control shaft; and a third engagement feature non-rotatably coupled to the third gate control shaft and movable along the third gate control shaft, wherein the third engagement feature is configured to block rotation of the third gate control shaft while the third engagement feature is engaged and to facilitate rotation of the third gate control shaft while the third engagement feature is disengaged, and the third engagement feature is configured to disengage via translation in the longitudinal direction relative to the third gate control shaft.

15. The flow control assembly of claim 9, comprising:
a first gate control link coupled to the first gate control shaft, wherein the first gate control link is configured to couple to the first gate of the seed meter, and the first gate control link is configured to move the first gate between the open position and the closed position in response to rotation of the first gate control shaft;

a second gate control link coupled to the second gate control shaft, wherein the second gate control link is configured to couple to the second gate of the seed meter, and the second gate control link is configured to move the second gate between the open position and the closed position in response to rotation of the second gate control shaft; and a third gate control link coupled to the third gate control shaft, wherein the third gate control link is configured to couple to the third gate of the seed meter, and the third gate control link is configured to move the third gate between the open position and the closed position in response to rotation of the third gate control shaft.

16. A flow control assembly for an agricultural metering system comprising:
a first gate control shaft configured to drive a first gate of a seed meter to transition between an open position and a closed position via rotation of the first gate control shaft;

a second gate control shaft configured to drive a second gate of the seed meter to transition between an open position and a closed position via rotation of the second gate control shaft;

an engagement feature non-rotatably coupled to the first gate control shaft or the second gate control shaft and movable along a respective gate control shaft, wherein the engagement feature is configured to block rotation of the respective gate control shaft while the engagement feature is engaged and to facilitate rotation of the respective gate control shaft while the engagement feature is disengaged, and the engagement feature is configured to disengage via translation in a longitudinal direction relative to the respective gate control shaft;

a handle configured to selectively engage each of a first engagement portion of the first gate control shaft and a second engagement portion of the second gate control shaft, wherein the handle is configured to drive the first gate control shaft to rotate via rotation of the handle between a first position that corresponds to the open position of the first gate and a second position that corresponds to the closed position of the first gate while the handle is engaged with the first engagement portion, and the handle is configured to drive the second gate control shaft to rotate via rotation of the handle between a third position that corresponds to the open position of the second gate and a fourth position that corresponds to the closed position of the second gate while the handle is engaged with the second engagement portion; and a locking assembly configured to secure the handle to the first engagement portion at least while the handle is in the first position, to enable the handle to be released from the first engagement portion at least while the handle is in the second position, to secure the handle to the second engagement portion at least while the handle is in the third position, and to enable the handle to be released from the second engagement portion at least while the handle is in the fourth position.

17. The flow control assembly of claim 16, wherein the handle comprises at least one recess configured to engage a corresponding first protrusion on the first engagement portion and a corresponding second protrusion on the second engagement portion to non-rotatably couple the handle to a respective engagement portion while the handle is engaged with the respective engagement portion.

18. The flow control assembly of claim 16, wherein the engagement feature comprises a protrusion configured to engage a recess within a frame of the agricultural metering system while the engagement feature is engaged, and the protrusion is configured to disengage the recess in response to translation of the engagement feature in the longitudinal direction relative to the respective gate control shaft.

19. The flow control assembly of claim 18, comprising a stop coupled to the frame, wherein the stop is configured to contact the protrusion to control rotation of the handle.

20. The flow control assembly of claim 16, wherein the locking assembly comprises a locking bar coupled to a frame of the agricultural metering system, and the locking bar comprises at least one recess configured to selectively receive a locking plate of the handle at least while the handle is in the first position and the third position to secure the handle to a respective engagement portion.

* * * * *